US012321828B2

(12) United States Patent
Zhou et al.

(10) Patent No.: US 12,321,828 B2
(45) Date of Patent: Jun. 3, 2025

(54) DOMAIN ADAPTATION

(71) Applicant: International Business Machines Corporation, Armonk, NY (US)

(72) Inventors: Yuan Zhou, Beijing (CN); Yi Qin Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 17/456,898

(22) Filed: Nov. 30, 2021

(65) Prior Publication Data

US 2023/0169389 A1    Jun. 1, 2023

(51) Int. Cl.
*G06N 20/00* (2019.01)
*G06F 18/214* (2023.01)
*G06F 18/2431* (2023.01)
*G06V 10/75* (2022.01)

(52) U.S. Cl.
CPC ........... *G06N 20/00* (2019.01); *G06F 18/214* (2023.01); *G06F 18/2431* (2023.01); *G06V 10/751* (2022.01)

(58) Field of Classification Search
CPC .... G06N 20/00; G06V 10/751; G06F 18/214; G06F 18/2431
See application file for complete search history.

(56) References Cited

U.S. PATENT DOCUMENTS

| 10,354,199 | B2 | 7/2019 | Clinchant | |
|---|---|---|---|---|
| 2014/0200878 | A1* | 7/2014 | Mylonakis | G06F 40/51 704/4 |
| 2016/0078359 | A1* | 3/2016 | Csurka | G06V 10/776 706/12 |
| 2017/0147944 | A1* | 5/2017 | Csurka | G06N 3/02 |
| 2018/0218284 | A1* | 8/2018 | Jawahar | G06N 3/08 |
| 2020/0130177 | A1* | 4/2020 | Kolouri | G06N 3/084 |
| 2021/0089872 | A1* | 3/2021 | Gan | G06N 3/045 |
| 2022/0093258 | A1* | 3/2022 | Li | A61B 5/7267 |
| 2022/0108134 | A1* | 4/2022 | Marrero | G06V 10/7753 |
| 2022/0138495 | A1* | 5/2022 | Xu | G06F 18/213 382/157 |

OTHER PUBLICATIONS

Cui et al., "Multi-source Attention for Unsupervised Domain Adaptation", arXiv:2004.06608v1 [cs.CL] Apr. 14, 2020, 13 pages.
Kim et al., "Domain Adaptation without Source Data", arXiv:2007.01524v1 [cs.CV] Jul. 3, 2020, 13 pages.

(Continued)

*Primary Examiner* — Barbara M Level
(74) *Attorney, Agent, or Firm* — Daniel M. Yeates (57) ABSTRACT

A computer implement method for domain adaptation. According to the method, training data from a target domain may be classified by using a group of source models of a source domain, where each of the source models is trained to classify data from the source domain. A first pseudo label indicating a category of the training data may be generated by aggregating classification results of the source models based on respective weights of the source models on predetermined data categories. A target model of the target domain may be trained based on the training data and the first pseudo label and the second pseudo label, where the target model is trained to classify data from the target domain.

20 Claims, 8 Drawing Sheets

(56) References Cited

OTHER PUBLICATIONS

Kothandaraman et al., "BoMuDA: Boundless Multi-Source Domain Adaptive Segmentation in Unconstrained Environments", arXiv:2010.03523v2 [cs.CV] Oct. 13, 2020, 13 pages.

Le et al., "Deep multi-Wasserstein unsupervised domain adaptation", Available online Apr. 30, 2019, 7 pages, <https://doi.org/10.1016/j.patrec.2019.04.025>.

Mell et al., The NIST Definition of Cloud Computing, National Institute of Standards and Technology, U.S. Department of Commerce, Special Publication 800-145, Sep. 2011, 7 pages.

Richard et al., "Unsupervised Multi-Source Domain Adaptation for Regression", Preprint submitted on Apr. 15, 2020, HAL Id: hal-02543790, 23 pages, <https://hal.archives-ouvertes.fr/hal-02543790>.

* cited by examiner

FIG. 8

DOMAIN ADAPTATION

BACKGROUND

The present disclosure relates to machine learning, and more specifically, to a method, system and computer program product for domain adaptation.

Along with the accumulation of data in various fields, machine learning algorithms have been widely used to build numerous models for various purposes. Sometimes, it is needed to adapt a model trained for an original situation (also referred to as "source domain") to a new situation (also referred to as "target domain"). When adapting the model from the source domain to the target domain, the training data and/or detailed implementation information of the model may be absent.

SUMMARY

According to one embodiment of the present disclosure, there is provided a computer-implemented method for domain adaptation. According to the method, one or more processors classify training data from a target domain by using a group of source models of a source domain, where each of the source models is trained to classify data from the source domain. One or more processors generate a first pseudo label indicating a category of the training data by aggregating classification results of the source models based on respective weights of the source models on predetermined data categories. In addition, one or more processors train a target model of the target domain based on the training data and the first pseudo label, where the target model is trained to classify data from the target domain.

According to another embodiment of the present disclosure, there is provided a system. The system comprises a processing unit and a memory coupled to the processing unit. The memory stores instructions that, when executed by the processing unit, perform actions comprising: classifying training data from a target domain by using a group of source models of a source domain, wherein each of the source models is trained to classify data from the source domain; generating a first pseudo label indicating a category of the training data by aggregating classification results of the source models based on respective weights of the source models on predetermined data categories; and training a target model of the target domain based on the training data and the first pseudo label, wherein the target model is trained to classify data from the target domain.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: classifying training data from a target domain by using a group of source models of a source domain, wherein each of the source models is trained to classify data from the source domain; generating a first pseudo label indicating a category of the training data by aggregating classification results of the source models based on respective weights of the source models on predetermined data categories; and training a target model of the target domain based on the training data and the first pseudo label, wherein the target model is trained to classify data from the target domain.

BRIEF DESCRIPTION OF THE DRAWINGS

Various embodiments are described herein with reference to different subject matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject matter, also any combination between features relating to different subject matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

Throughout the drawings, same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
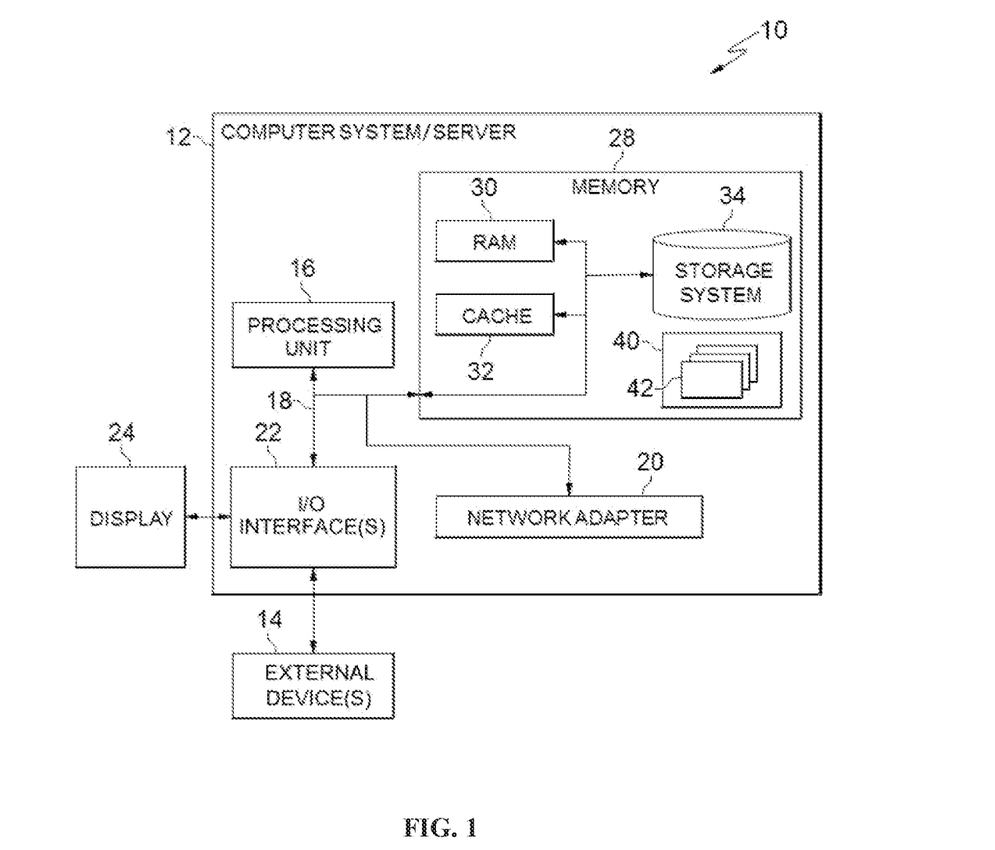
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
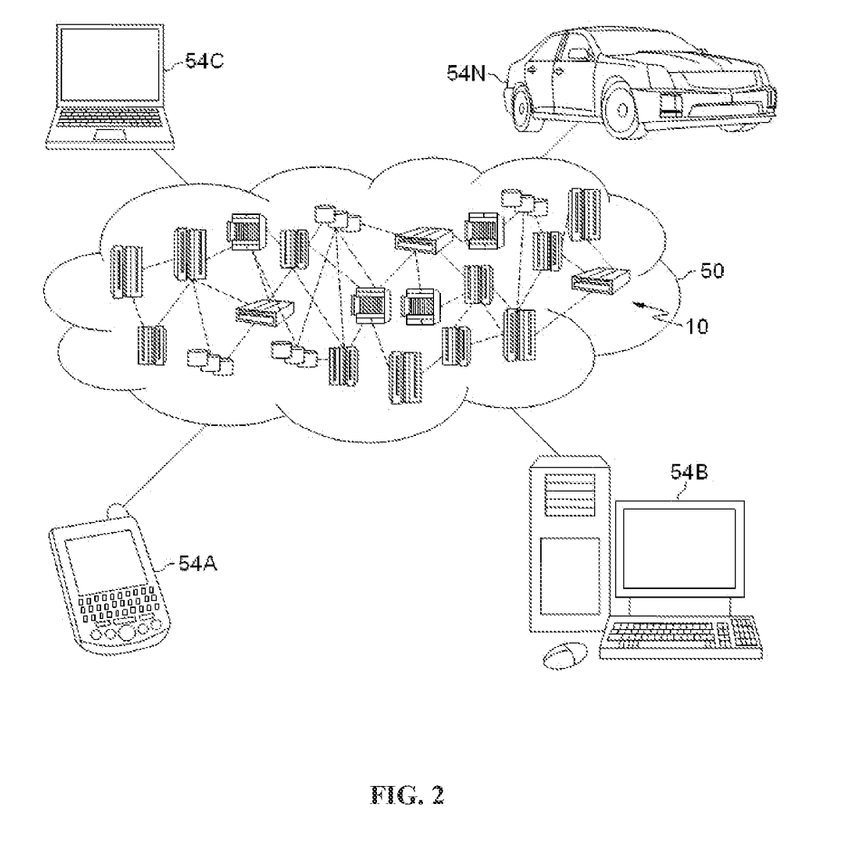
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
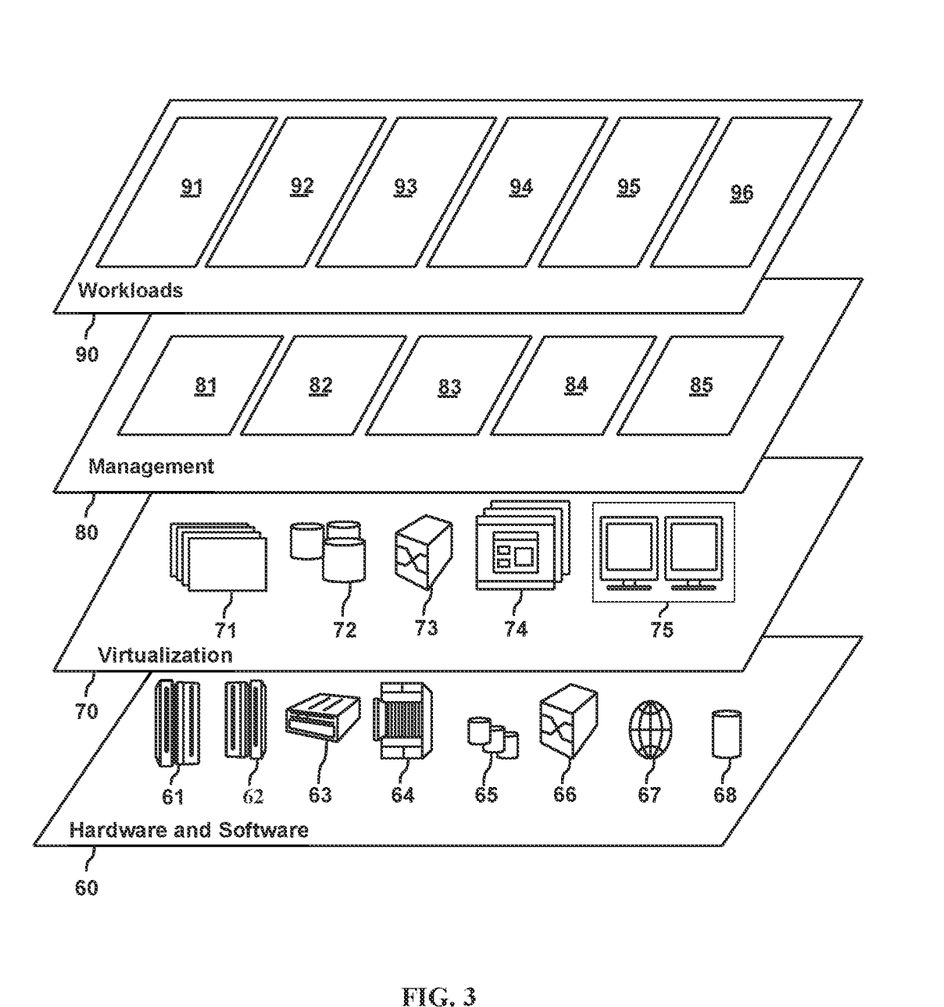
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain adaptation 96. Hereinafter, reference will be made to FIG. 4 to FIG. 8 to describe details of the domain adaptation 96.

Domain adaptation focuses on transferring a trained model (also referred to as "source model") from a source domain to a target domain. For example, in the healthcare scenario, plenty of models are built on a defined cohort (such as, people from a defined region). These models can classify healthcare data of a patient from this cohort and predict a disease that the patient suffers from. However, due to different characteristic of different cohorts, when using these models on a new cohort/dataset (such as, people from another region), their prediction results may not be accurate. Therefore, before these models are used on the new cohort, the models, in some embodiments, need to be adjusted for the specific traits of the new cohorts. In some embodiments, domain adaptation is used to adapt these models to the new cohort.

Many of traditional solutions for domain adaptation utilize training samples (that is, training data labeled with its category) from both the source domain and the target domain. These solutions can require that the performance of the source model is good enough for the new domain and also require access to the model structure and model parameters of the source model. However, in most situations, these conditions cannot be satisfied. In many situations the training data for training the source model and/or the model structure and model parameters of the source model cannot be obtained. For example, in the healthcare scenario as described above, sharing of healthcare data is highly restricted. Additionally, the training data may be difficult/impossible to obtain from the target domain. It may also be difficult to obtain, from the target domain, training data which is labeled with its category.

In order to at least partially solve the above and other potential problems, embodiments of the present disclosure provide a solution for domain adaptation. According to embodiments of the present disclosure, training data from a target domain may be classified by using a group of source models of a source domain, where each of the source models is trained to classify data from the source domain. In some embodiments, a first pseudo label indicating a category of the training data may be generated by aggregating classification results of the source models based on respective weights of the source models on predetermined data categories. In some embodiments, a target model of the target domain may be trained based on the training data and the first pseudo label and the second pseudo label, where the target model is trained to classify data from the target domain.

In this way, knowledge of a group of source models trained for the source domain can be transferred to a target model trained for the target domain without access to training samples from the source domain or detailed implementation information of the source models (such as, model structures, model parameters, and so on). Moreover, the training data from the target domain used for training the target model does not need to be labeled with an associated category.

Embodiments of the present disclosure can be applied to scenarios where models are frequently adapted to new domains but the access of the source training data is restricted. In the following, the healthcare scenario will be taken as an example scenario to describe embodiments of the present disclosure. It is to be understood that this is merely for the purpose of illustration, without suggesting any limitations as to the scope of the present disclosure.

As used herein, the term "model" may refer to a machine learning model which can handle inputs and provide corresponding outputs. Examples of the model may include but not be limited to linear model, non-linear model, neutral network model and so on. Taking the neutral network model as an example, the neutral network model usually includes an input layer, an output layer and one or more hidden layers between the input and output layers. Individual layers of the neural network model are connected in sequence, such that an output of a preceding layer is provided as an input for a following layer, where the input layer receives the input of the neural network model while the output of the output layer acts as the final output of the neural network model. Each layer of the neural network model includes one or more nodes (also known as processing nodes or neurons) and each node processes the input from the preceding layer.

Figure 4:
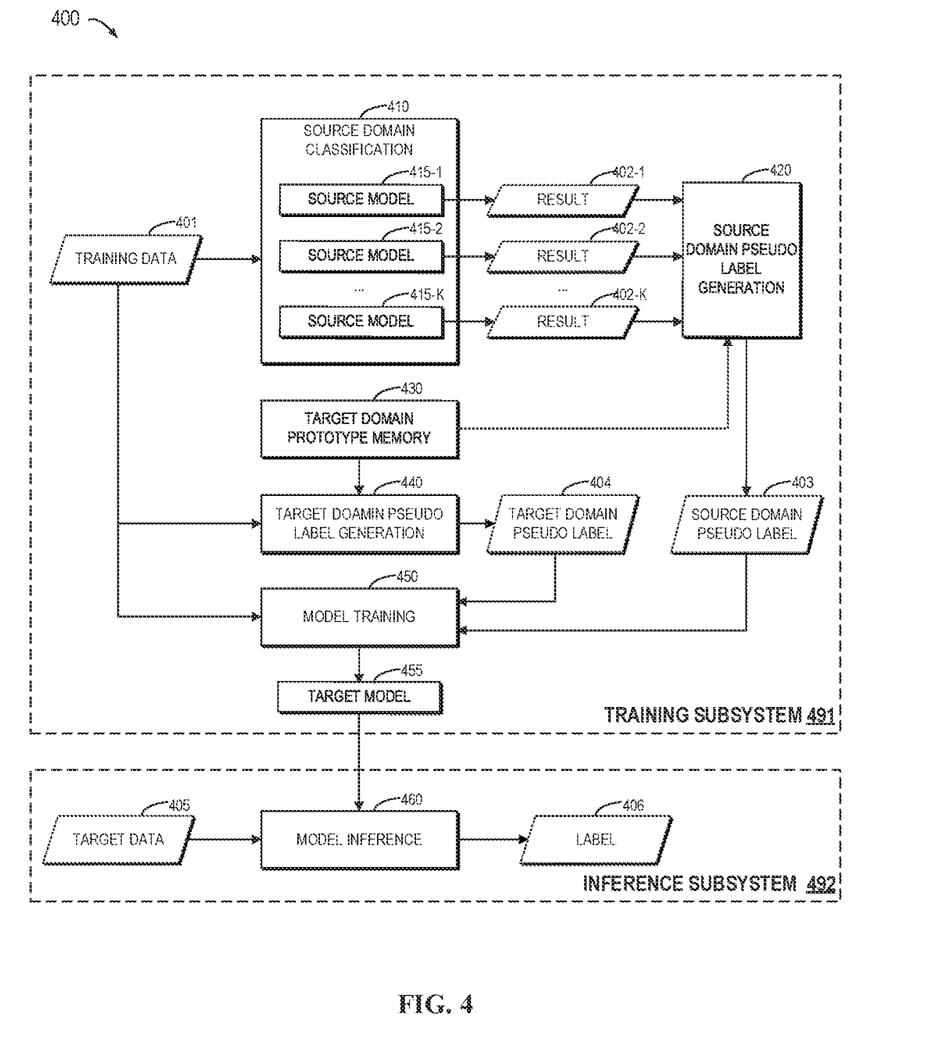
FIG. 4 depicts a system learning model domain adaption according to embodiments of the present disclosure.

With reference now to FIG. 4, a system 400 in which embodiments of domain adaption from the present disclosure can be implemented is shown. It is to be understood that the structure and functionality of the system 400 are described only for the purpose of illustration without suggesting any limitations as to the scope of the present disclosure. The embodiments of the present disclosure can be embodied with a different structure and/or functionality.

As shown in FIG. 4, the system 400 may generally comprise a training subsystem 491 and an inference subsystem 492. The training subsystem 491 may comprise a source domain classification apparatus 410 (also referred to as "apparatus 410" in the following), a source domain pseudo label generation apparatus 420 (also referred to as "apparatus 420" in the following), a target domain prototype memory 430 (also referred to as "apparatus 430" in the following), a target domain pseudo label generation apparatus 440 (also referred to as "apparatus 440" in the following) and a model training apparatus 450 (also referred to as "apparatus 450" in the following). The inference subsystem 492 may comprise a model inference apparatus 460 (also referred to as "apparatus 460" in the following). In some embodiments, the apparatuses 410-460 can be implemented in different physical devices, respectively. Alternatively, in some embodiments, some of the apparatuses 410-460 can be implemented in a same physical device. For example, at least part or all of the apparatuses 410-460 may be implemented by computer system/server 12 of FIG. 1.

According to embodiments of the present disclosure, the solution for domain adaptation may comprise two phases: a training phase implemented by the training subsystem 491, and an inference phase implemented by the inference subsystem 492. During the training phase, the training subsystem 491 may transfer knowledge of a group of source models of a source domain to a target model of the target domain. During the inference phase, the inference subsystem 492 may perform an inference task by using the target model.

During the training phase, the apparatus 410 may classify training data 401 from a target domain by using a group of source models 415-1, 415-2 ... 415-K of the source domain to output a group of classification results 402-1, 402-2 ... 402-K, where K represents the number of source models and K≥1. The source models 415-1, 415-2 ... 415-K are collectively or individually referred to as "source model(s) 415" in the following. The classification results 402-1, 402-2 ... 402-K are collectively or individually referred to as "classification result(s) 402" in the following. Each of the source models 415 is trained to classify data from the source domain. For example, each of the classification results 402 may indicate a probability distribution of the training data 401 on predetermined data categories. The probability distribution may indicate a respective probability that the training data 401 belongs to each of the predetermined data categories.

In the healthcare scenario, for example, the source domain may represent a first region, such as, a country. Each source model 415 may be trained to classify healthcare data of a patient from the first region and determine a respective probability that the patient suffers from each of a plurality of predetermined diseases. The predetermined diseases can be regarded as the predetermined data categories described above. The target domain may represent a second region different from the first region, such as, another country. The training data 401 may comprise healthcare data of a patient from the second region. For example, the training data 401 may be unlabeled with its category. That is, the healthcare data of the patient from the second region may be not labeled with the disease that the patient actually suffers from.

As shown in FIG. 4, the classification results 402 are provided to the apparatus 420, which aggregates the classification results 402 based on respective weights of the source models 415 on the predetermined data categories and generate a source domain pseudo label 403 (also referred to as "first pseudo label" in the following) indicating a predicted category of the training data 401. It is assumed that for a certain training iteration t, the weights of the source models 415 on the predetermined data categories are represented by a weight matrix $\Gamma_t \in \mathbb{R}^{K \times C}$, where $\mathbb{R}$ represents the real number domain, K is the number of source models, C is the total number of predetermined data categories, the $k_{th}$ row of the weight matrix $\Gamma_t$ are the weights of the $k_{th}$ source model on each category and the $c_{th}$ column of the weight matrix $\Gamma_t$ are the weights of each source model on category c. The classification results 402 of the source models 415 are represented by $\hat{y}^s \in \mathbb{R}^{C \times K}$, where $\mathbb{R}$ represents the real number domain, K is the number of source models, and C is the total number of predetermined data categories. In some embodiments, the first pseudo label 403 can be determined as below:

$$\hat{y}^s = \underset{c}{\mathrm{argmax}} \frac{1}{C} \sum_{k=1}^{C} \hat{y}^s \gamma_t^C \quad (1)$$

where $\gamma_t^c$ is the $c_{th}$ column of the weight matrix $\Gamma_t$.

In some embodiments, initially, the weights of the source models 415 on the predetermined data categories may be initialized to a same value. During the training phase, the weights of the source models 415 on the predetermined data categories can be adjusted based on the target domain prototype memory 430.

The target domain prototype memory 430 may store a plurality of groups of data samples from the target domain, where each group of data samples relates to a corresponding one of the predetermined data categories. In some embodiments, the target domain prototype memory 430 can be constructed by using a target model 455 from the target domain.

Initially, the target model 455 may only be initialized but not yet trained. The initialized target model 455 can be used to classify each data in a large dataset from the target domain and generate a classification result for each data. For example, the dataset comprises various categories of data from the target domain. The classification result for each data may be a probability distribution of the data. A confidence level of the classification result can be determined for each data in the large dataset, which indicates the reliability of the classification result of each data. For example, the confidence level may be determined based on self-entropy, where smaller self-entropy indicates a higher confidence level. It is to be understood that, the confidence level can also be determined in a different manner currently known or to be developed in the future. The scope of the present disclosure will not be limited in this aspect.

Then, a group of data samples can be selected, from the large dataset, for each of the predetermined data categories, where each of the selected data samples is associated with a confidence level exceeding a predetermined threshold. That is, the data samples of each data category comprised in the target domain prototype memory 430 are relatively reliable data samples of that data category from target domain.

It is to be understood that, during the training phase, the model parameters of the target model 455 can be updated. In some embodiments, the target domain prototype memory 430 can be updated periodically by utilizing the updated target model 455. It is also to be understood that, the target domain prototype memory 430 can be constructed in a different manner currently known or to be developed in the future. The scope of the present disclosure will not be limited in this aspect.

As described above, during the training phase, the weights of the source models 415 on the predetermined data categories can be adjusted based on the target domain prototype memory 430. In some embodiments, in order to adjust the respective weights of the source models on the predetermined data categories, each group of data samples relating to each of the predetermined data categories comprised in the target domain prototype memory 430 can be classified by using the source models 415 and the target model 455. The respective weights of the source models 415 on the predetermined data categories can be adjusted based on differences among classification results of the source models 415 and classification results of the target model 455.

In the following, it is assumed that the source models from the source domain are represented by $M^s = \{M_k^s | k \in [1, K]\}$, where K is the number of source models. Given a data sample x from the target domain prototype memory 430, the classification result of the source model $M_k^s$, is represented by $\hat{y}_k^s \in \mathbb{R}^C$, where $\mathbb{R}$ represents the real number domain and C represents the total number of predetermined data categories. For a certain training iteration t, the target domain prototype memory 430 is represented by $PM_t$, and the weights of the source models on the predetermined data categories are represented by a weight matrix $\Gamma_t \in \mathbb{R}^{K \times C}$.

In some embodiments, for each category c in the predetermined data categories, each data sample $x_i$ of category c in $PM_t$ may be input to each source model $M_k^s$ to get a probability distribution $\hat{y}_{k,i,c}^s$ of the data sample $x_i$ on the predetermined data categories. Each data sample $x_i$ of category c in $PM_t$ may also be input to the target model to get a probability distribution $y_{i,c}^t$ of the data sample $x_i$ on the predetermined data categories. The distance between $\hat{y}_{k,i,c}^s$ and $y_{i,c}^t$ may be determined as: $d_{k,i,c} = \hat{y}_{k,i,c}^s - y_{i,c}^t$, which indicates a difference between classification results of the source model $M_k^s$ and the target model with respect to each data sample $x_i$ of category c. Then, the distance over all data samples of category c may be determined as:

$$d_{k,c} = \frac{1}{I^c} \sum_{i=1}^{I^c} d_{k,i,c},$$

where $I^c$ represents the total number of data samples of category c in $PM_t$. The distance vector for all source models on category c can be determined as: $d_c \leftarrow (d_{1,c}, \ldots, d_{K,c})^T$. The distance matrix for all source models on all categories can be determined as: $D_{t-1} \leftarrow \mathrm{normalize}(d_1, \ldots, d_C)$, where normalize( ) means a normalization function. Then, the weight matrix $\Gamma_t$ can be updated as: $\Gamma_t \leftarrow \Gamma_{t-1} + \beta D_{t-1}$, where $\beta$ represents a predetermined step for adjusting the weight matrix.

Figure 5:
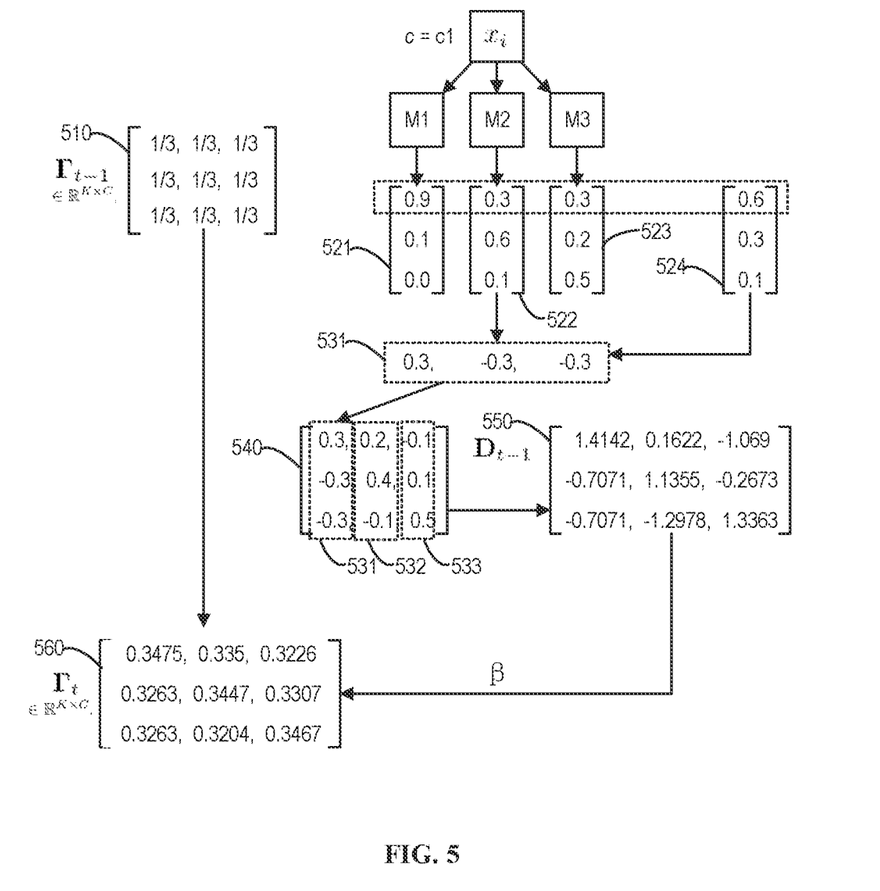
FIG. 5 depicts a schematic diagram of adjusting respective weights of source models on predetermined data categories according to embodiments of the present disclosure.

FIG. 5 depicts a schematic diagram of adjusting the weights of the source models on the predetermined data categories according to embodiments of the present disclosure. In the example as shown in FIG. 5, it is assumed that there are three source models M={M1, M2, M3}. It is also assumed that there are three predetermined data categories C={c1, c2, c3}. For a certain training iteration t, the target domain prototype memory $PM_t$ comprises data samples of three categories. That is, $PM_t$=c1:{$x_i | i \in [1, I^{c1}]$}, c2:{$x_i | i \in [1, I^{c2}]$}, c3:{$x_i | i \in [1, I^{c3}]$}, where $I^{c1}$ represents the total number of data samples of category c1 in $PM_t$, $I^{c2}$ represents the total number of data samples of category c2 in $PM_t$, and $I^{c3}$ represents the total number of data samples of category c3 in $PM_t$. In the example as shown in FIG. 5, $I^{c1}=I^{c2}=I^{c3}=1$.

FIG. 5 shows the weight matrix 510 determined at the training iteration t−1, that is, $\Gamma_{t-1} \in \mathbb{R}$. For example, in the weight matrix 510, the weights of the source models M1~M3 on different categories c1~c3 may be initialized to a same value, that is, ⅓. The data sample $x_i$ of category c1 may be input to each of the source models M1~M3 to get three probability distributions 521, 522 and 523. The data sample $x_i$ of category c1 may also be input to the target model 455 to get a probability distribution 524. For category c1, the distances between the probability distribution 524 and each of the probability distributions 521, 522 and 523 can be determined. For example, $d_{1,c1}$=0.9−0.6=0.3; $d_{2,c1}$=0.3−0.6=−0.3; and $d_{3,c1}$=0.3−0.6=−0.3. As such, a distance vector 531 for the source models M1~M3 on category c1 can be determined as $d_c \leftarrow (d_{1,c1}, d_{2,c1}, d_{3,c1})^T$. Similarly, the data sample $x_i$ of category c2 may be input to each of the source models M1~M3 and the target model 455, to derive a distance vector 532 for the source models M1~M3 on category c2. The data sample $x_i$ of category c3 may be input to each of the source models M1~M3 and the target model 455, to derive a distance vector 533 for the source models M1~M3 on category c3. Thus, a distance matrix 540 for all source models on all categories c1~c3 can be determined based on the distance vectors 531-533. The distance matrix 540 can be normalized into a distance matrix 550, that is, $D_{t-1}$. Then, the weight matrix 560, that is $\Gamma_t$ can be updated as: $\Gamma_t \leftarrow \Gamma_{t-1} + \beta D_{t-1}$, for example, β=0.01.

Since the target domain prototype memory 430 can be updated during the training phase to include more reliable data samples for each data category, the weights of the source models 415 on the predetermined data categories can be iteratively adjusted based on the target domain prototype memory 430.

With reference back to FIG. 4, the training data 401 may also be provided to the apparatus 440, which may generate a target domain pseudo label 404 (also referred to as "second pseudo label 404") for the training data 401 by utilizing the target domain prototype memory 430.

As described above, the target domain prototype memory 430 may store a plurality of groups of reliable data samples from the target domain corresponding to the predetermined data categories. In some embodiments, the apparatus 440 may compare the training data 401 with each group of data samples and determine a similarity between the training data 401 and data samples of each predetermined data category. For example, the apparatus 440 may utilize the target model 455 to extract a feature of the training data 401 and determine a similarity score between the feature of the training data 401 and data samples of each predetermined data category in the target domain prototype memory 430. The second pseudo label 404 may be generated to indicate one of the predetermined data categories, where data samples of the predetermined data category have the highest similarity score with the training data 401.

With reference back to FIG. 4, the training data 401, the first pseudo label 403 and the second pseudo label 404 may be provided to the apparatus 450 for training the target model 455 of the target domain. The target model 455 may be trained based on a machine learning algorithm to classify data from the target domain. In some embodiments, the apparatus 450 may generate at least one label for the training data by classifying the training data with the target model and determine a loss of the target model 455 based on the at least one label, the first pseudo label and the second pseudo label. The apparatus 450 may update parameters of the target model 455 such that the loss is minimized.

Figure 6:
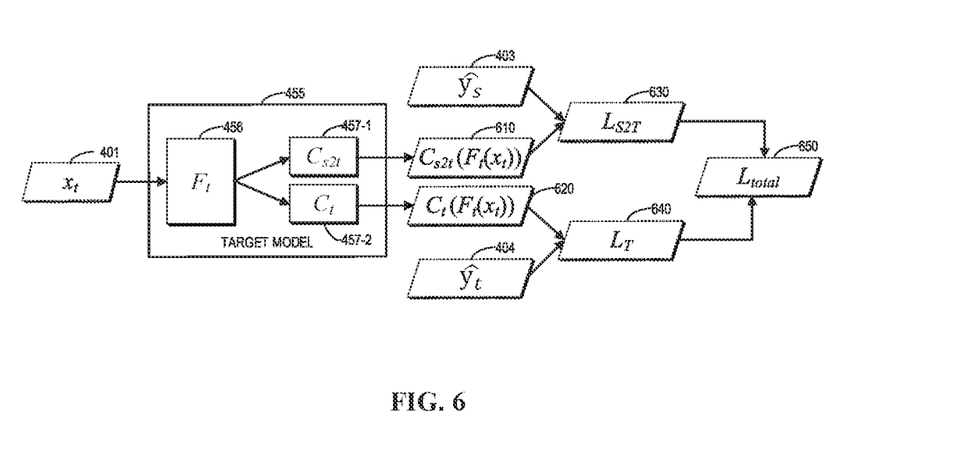
FIG. 6 depicts a schematic diagram of training a target model according to embodiments of the present disclosure.

FIG. 6 depicts a schematic diagram of training a target model according to embodiments of the present disclosure.

As shown in FIG. 6, the target model 455 may comprise one or more feature extraction layers 456, which are represented by $F_t$. The feature extraction layers 456 can extract a feature from the training data 401. For example, the training data 401 is represented by $x_t$ and the extracted feature can be represented by $F_t(x_t)$.

As shown in FIG. 6, during the training phase, the target model 455 may comprise two output layers 457-1 and 457-2 in parallel, for generating two different labels to be compared with the first pseudo label 403 and the second first pseudo label 404 respectively. The output layer 457-1 may generate a label 610 for the training data 401 based on the feature $F_t(x_t)$. For example, the output layer 457-1 is represented by $C_{S2T}$ and the label 610 is represented by $C_{S2T}(F_t(x_t))$. Likewise, the output layer 457-2 may generate a label 620 for the training data 401 based on the feature $F_t(x_t)$. For example, the output layer 457-2 is represented by $C_T$ and the label 620 is represented by $C_T(F_t(x_t))$. After the training phase is completed, the trained target model 455 may have only one output layer. For example, the output layer 457-1 will be removed during the inference phase.

In some embodiments, a first loss 630 may be determined based on the first pseudo label 403 and the label 610 as below:

$$L_{S2T} = -\mathbb{E}_{x_t \sim D_t} \sum_{c=1}^{N_c} \mathbb{1}_{[c=\hat{y}_s]} \log(\sigma(C_{s2t}(F_t(x_t)))) \quad (2)$$

where $D_t$ represents the target domain, $N_c$ represents the total number of predetermined data categories, σ( ) represents a softmax function, $\hat{y}_s$ represents the first pseudo label 403. $\mathbb{1}_{[c=\hat{y}_s]}$ is an indicator function, where if $\hat{y}_s$, the function equals to 1 and otherwise, the function equals to 0.

In some embodiments, a second loss 640 may be determined based on the second pseudo label 404 and the label 620 as below:

$$L_T = -\mathbb{E}_{x_t \sim D_t} \sum_{c=1}^{N_c} \mathbb{1}_{[c=y_s]} \log(\sigma(C_t(F_t(x_t)))) \quad (3)$$

where $\hat{y}_t$ represents the second pseudo label 404. $\mathbb{1}_{[c=y_t]}$ is an indicator function, where if $\hat{y}_t$, the function equals to 1 and otherwise, the function equals to 0. In some embodiments, a total loss 650 of the target model 455 may be determined based on the first loss 630 and the second loss 640 as below:

$$L_{total}(D_t) = (1-\alpha)L_{S2T} + \alpha L_T \quad (4)$$

where a is a weight of the loss 640 and (1−α) is a weight of the loss 630. In some embodiments, for example, α=2(1+ exp(−10·iter/max_iter))$^{-1}$−0.5), where iter represents an index of the current training iteration and max_iter represents the maximum number of iterations for training the target model. It is to be understood that the weight a can be determined in a different manner currently known or to be developed in the future. The scope of the present disclosure will not be limited in this aspect. In some embodiments, the apparatus 450 may update the parameters of the target model 455 such that the total loss 650 is minimized. As such, the training phase is completed.

As shown in FIG. 4, the trained target model 455 may be provided to the apparatus 460. During the inference phase, the apparatus 460 may obtain target data 405 to be classified from the target domain and generate a label 406 indicating a category of the target data by using the trained target model 455. In the healthcare scenario, for example, the target data 405 may comprise healthcare data of a patient from the second region. The training target model 455 may classify the healthcare data of the patient from the second region and predict a disease that the patient suffers from based on the healthcare data. The label 406 may indicate the predicted disease.

In view of the above, it can be seen that embodiments of the present disclosure can transfer knowledge of a group of source models trained for the source domain to a target model trained for the target domain without access to training data from the source domain or detailed implementation information of the source models (such as, model structures, model parameters, or so on). Moreover, the training data from the target domain used for training the target model does not need to be labeled with its category. As such, embodiments of the present disclosure can be applied to scenarios where models are frequently adapted to new domains but the access of the source training data is restricted.

Figure 7:
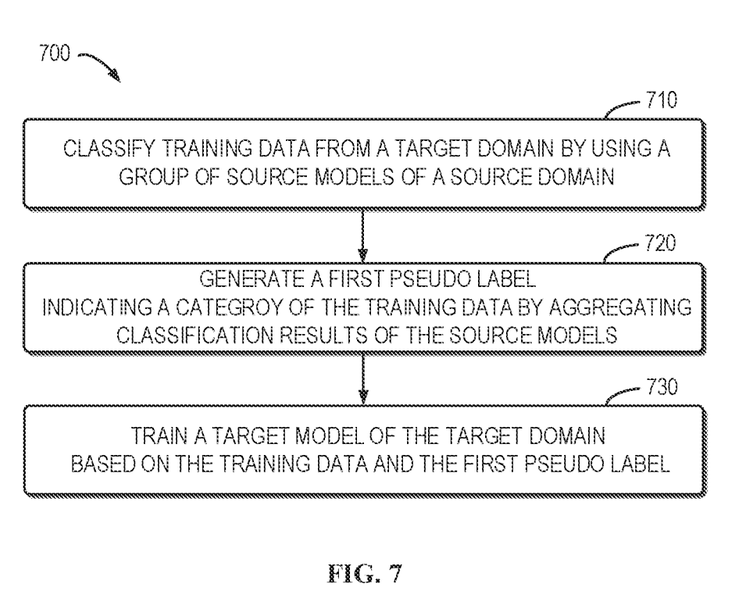
FIG. 7 depicts a flowchart of an example method for domain adaptation according to embodiments of the present disclosure.

FIG. 7 depicts a flowchart of an example method 700 for domain adaptation according to embodiments of the present disclosure. For example, the method 700 may be implemented by the training subsystem 491 as shown in FIG. 4. It is to be understood that the method 700 may also comprise additional blocks (not shown) and/or may omit the illustrated blocks. The scope of the present disclosure described herein is not limited in this aspect.

At block 710, the training subsystem 491 (for example, by means of the apparatus 410) classifies training data from a target domain by using a group of source models of a source domain, where each of the source models is trained to classify data from the source domain.

At block 720, the training subsystem 491 (for example, by means of the apparatus 420) generates a first pseudo label indicating a category of the training data by aggregating classification results of the source models based on respective weights of the source models on predetermined data categories.

At block 730, the training subsystem 491 (for example, by means of the apparatus 450) trains a target model of the target domain based on the training data and the first pseudo label, where the target model is trained to classify data from the target domain.

In some embodiments, the training subsystem 491 (for example, by means of the apparatus 440) may generate a second pseudo label indicating a category of the training data by comparing the training data with a plurality of groups of data samples from the target domain, where each group of data samples relates to a corresponding one of the predetermined data categories. The training subsystem 491 (for example, by means of the apparatus 450) may train the target model of the target domain based on the training data, the first pseudo label and the second pseudo label.

In some embodiments, the training subsystem 491 may obtain the plurality of groups of data samples by classifying each data sample in a set of data samples from the target domain by using the target model; determining a confidence level of a classification result for each data sample in the set of data samples; and selecting a group of data samples for each of the predetermined data categories from the set of data samples, where each of the selected data samples is associated with a confidence level exceeding a predetermined threshold.

In some embodiments, the training subsystem 491 may initialize the respective weights of the source models on the predetermined data categories. Then, the training subsystem 491 may adjust the respective weights of the source models on the predetermined data categories based on the plurality of groups of data samples.

In some embodiments, the training subsystem 491 may adjust the respective weights of the source models on the predetermined data categories by classifying a group of data samples relating to each of the predetermined data categories by using both the source models and the target model; determining differences among classification results of the source models and classification results of the target model; and adjusting the respective weights based on the differences.

In some embodiments, the training subsystem 491 may train the target model by generating at least one label for the training data by classifying the training data with the target model; determining a loss of the target model based on the at least one label, the first pseudo label and the second pseudo label; and updating at least one parameter of the target model such that the loss is minimized.

In some embodiments, the training subsystem 491 may generate the at least one label for the training data by obtaining a feature of the training data from a feature extraction layer of the target model and inputting the feature to at least one output layer of the target model for classifying the training data.

In some embodiments, the at least one label comprises a first label and a second label generated with different output layers. The training subsystem 491 may determine the loss of the target model by determining a first loss based on the first label and the first pseudo label; determining a second loss based on the second label and the second pseudo label; and determining the loss of the target model based on the first loss and the second loss.

In some embodiments, in response to the target model being updated during the training, the training subsystem 491 may update the plurality of groups of data samples by using the updated target model.

Figure 8:
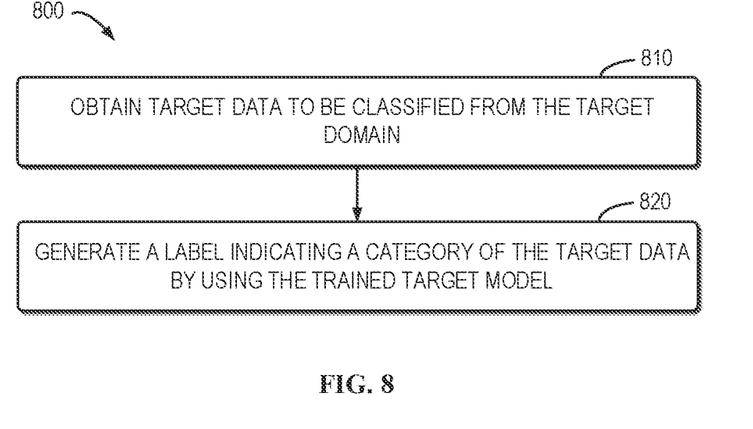
FIG. 8 depicts a flowchart of an example method for domain adaptation according to embodiments of the present disclosure.

FIG. 8 depicts a flowchart of an example method 800 for domain adaptation according to embodiments of the present disclosure. For example, the method 800 may be implemented by the inference subsystem 492 as shown in FIG. 4. It is to be understood that the method 800 may also comprise additional blocks (not shown) and/or may omit the illustrated blocks. The scope of the present disclosure described herein is not limited in this aspect.

At block 810, the inference subsystem 492 obtains target data to be classified from the target domain.

At block 820, the inference subsystem 492 generates a label indicating a category of the target data by classifying the target data with the trained target model.

It should be noted that the domain adaptation according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for domain adaptation comprising:
classifying, by one or more processors, training data from a target domain by using a group of source models of a source domain, wherein each of the source models is trained to classify data from the source domain;
generating, by one or more processors, a first pseudo label indicating a category of the training data by aggregating classification results of the source models based on respective weights of the source models on predetermined data categories;
generating, by one or more processors, a second pseudo label indicating the category of the training data by comparing the training data with a plurality of groups of data samples from the target domain; and
training, by one or more processors, a target model of the target domain based on the training data and the first pseudo label and the second pseudo label, wherein the target model is trained to classify data from the target domain, and the training further comprises:
generating at least one label for the training data by classifying the training data with the target model;
determining a loss of the target model based on the at least one label, the first pseudo label and the second pseudo label; and
updating at least one parameter of the target model such that the loss is minimized.

2. The method of claim 1, wherein
each group of data samples relates to a corresponding one of the predetermined data categories.

3. The method of claim 2, further comprising:
initializing, by one or more processors, the respective weights of the source models on the predetermined data categories; and
adjusting, by one or more processors, the respective weights of the source models on the predetermined data categories based on the plurality of groups of data samples.

4. The method of claim 3, wherein adjusting the respective weights of the source models on the predetermined data categories comprises:
classifying, by one or more processors, a group of data samples relating to each of the predetermined data categories by using both the source models and the target model;
determining, by one or more processors, differences among classification results of the source models and classification results of the target model; and
adjusting, by one or more processors, the respective weights based on the differences.

5. The method of claim 2, wherein training the target model of the target domain based on the training data, the first pseudo label and the second pseudo label comprises:

generating, by one or more processors, at least one label for the training data by classifying the training data with the target model;
determining, by one or more processors, a loss of the target model based on the at least one label, the first pseudo label and the second pseudo label; and
updating, by one or more processors, at least one parameter of the target model such that the loss is minimized.

6. The method of claim 5, wherein generating the at least one label comprises:
obtaining, by one or more processors, a feature of the training data from a feature extraction layer of the target model; and
inputting, by one or more processors, the feature to at least one output layer of the target model for classifying the training data.

7. The method of claim 6, wherein the at least one label comprises a first label and a second label generated with different output layers, and determining the loss of the target model comprises:
determining, by one or more processors, a first loss based on the first label and the first pseudo label;
determining, by one or more processors, a second loss based on the second label and the second pseudo label; and
determining, by one or more processors, the loss of the target model based on the first loss and the second loss.

8. The method of claim 2, further comprising:
classifying, by one or more processors, each data sample in a set of data samples from the target domain by using the target model;
determining, by one or more processors, a confidence level of a classification result for each data sample in the set of data samples; and
determining, by one or more processors, the plurality of groups of data samples by selecting a group of data samples for each of the predetermined data categories from the set of data samples, wherein each of the selected data samples is associated with a confidence level exceeding a predetermined threshold.

9. The method of claim 8, further comprising:
in response to the target model being updated during the training, updating, by one or more processors, the plurality of groups of data samples by using the updated target model.

10. The method of claim 1, further comprising:
obtaining, by one or more processors, target data to be classified from the target domain; and
generating, by one or more processors, a label indicating a category of the target data by using the trained target model.

11. A system for domain adaptation comprising:
a processing unit; and
a memory coupled to the processing unit and storing instructions thereon, the instructions, when executed by the processing unit, are configured to cause the processing unit to:
classify training data from a target domain by using a group of source models of a source domain, wherein each of the source models is trained to classify data from the source domain;
generate a first pseudo label indicating a category of the training data by aggregating classification results of the source models based on respective weights of the source models on predetermined data categories;
generate, by one or more processors, a second pseudo label indicating the category of the training data by comparing the training data with a plurality of groups of data samples from the target domain;

train a target model of the target domain based on the training data and the first pseudo label, wherein the target model is trained to classify data from the target domain;

classify each data sample in a set of data samples from the target domain using the target model;

determine a confidence level of a classification result for each data sample in the set of data samples; and determine the plurality of groups of data samples by selecting a group of data samples for each of the predetermined data categories from the set of data samples, wherein each of the selected data samples is associated with a confidence level exceeding a predetermined threshold.

12. The system of claim 11, wherein each group of data samples relates to a corresponding one of the predetermined data categories; and wherein the training the target model of the target domain is further based on the second pseudo label.

13. The system of claim 12, wherein the instruction are further configured to cause the processing unit to:

initialize the respective weights of the source models on the predetermined data categories; and adjust the respective weights of the source models on the predetermined data categories based on the plurality of groups of data samples.

14. The system of claim 12, wherein training the target model of the target domain based on the training data, the first pseudo label and the second pseudo label comprises:

generate at least one label for the training data by classifying the training data with the target model;

determine a loss of the target model based on the at least one label, the first pseudo label and the second pseudo label; and update at least one parameter of the target model such that the loss is minimized.

15. The system of claim 11, wherein the instruction are further configured to cause the processing unit to:

obtain target data to be classified from the target domain; and generate a label indicating a category of the target data by using the trained target model.

16. A computer program product being tangibly stored on a non-transitory machine-readable medium and comprising machine-executable instructions, the instructions, when executed on a device, causing the device to perform actions comprising:

classifying training data from a target domain by using a group of source models of a source domain, wherein each of the source models is trained to classify data from the source domain;

generating a first pseudo label indicating a category of the training data by aggregating classification results of the source models based on respective weights of the source models on predetermined data categories; and training a target model of the target domain based on the training data and the first pseudo label, wherein the target model is trained to classify data from the target domain adjust, by one or more processors, the respective weights of the source models on the predetermined data categories based on a plurality of groups of data samples, wherein the adjustment further comprises:

classifying, a group of data samples relating to each of the predetermined data categories by using both the source models and the target model;

determining differences among classification results of the source models and classification results of the target model; and adjusting the respective weights based on the differences.

17. The computer program product of claim 16, wherein training the target model of the target domain based on the training data and the first pseudo label comprises:

generating a second pseudo label indicating a category of the training data by comparing the training data with the plurality of groups of data samples from the target domain, wherein each group of data samples relates to a corresponding one of the predetermined data categories; and wherein the training the target model of the target domain is further based on the second pseudo label.

18. The computer program product of claim 17, wherein the actions further comprise:

initializing the respective weights of the source models on the predetermined data categories.

19. The computer program product of claim 17, wherein training the target model of the target domain based on the training data, the first pseudo label and the second pseudo label comprises:

generating at least one label for the training data by classifying the training data with the target model;

determining a loss of the target model based on the at least one label, the first pseudo label and the second pseudo label; and updating at least one parameter of the target model such that the loss is minimized.

20. The computer program product of claim 16, wherein the actions further comprise:

obtaining target data to be classified from the target domain; and generating a label indicating a category of the target data by using the trained target model.

* * * * *